UNITED STATES PATENT OFFICE.

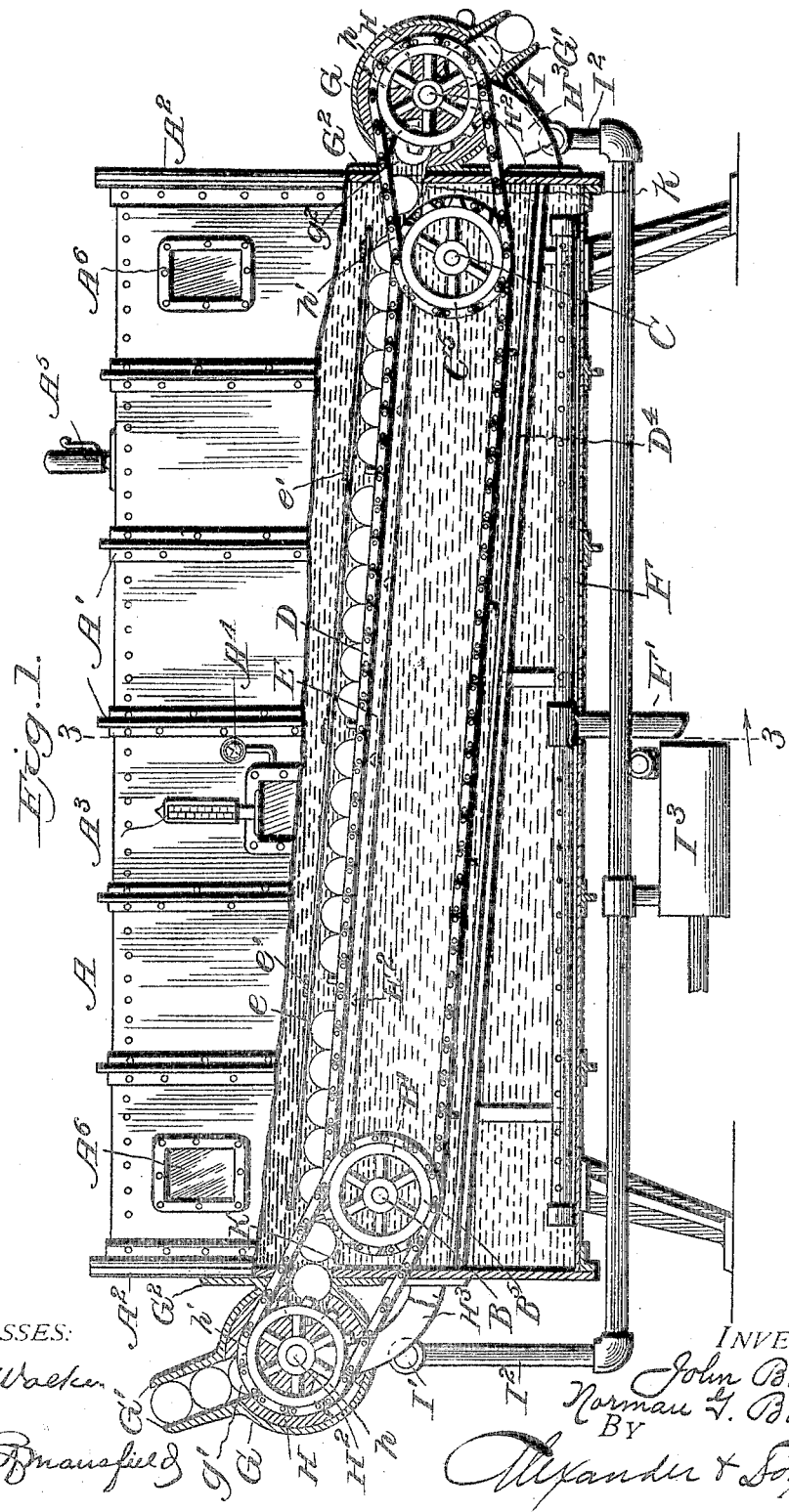

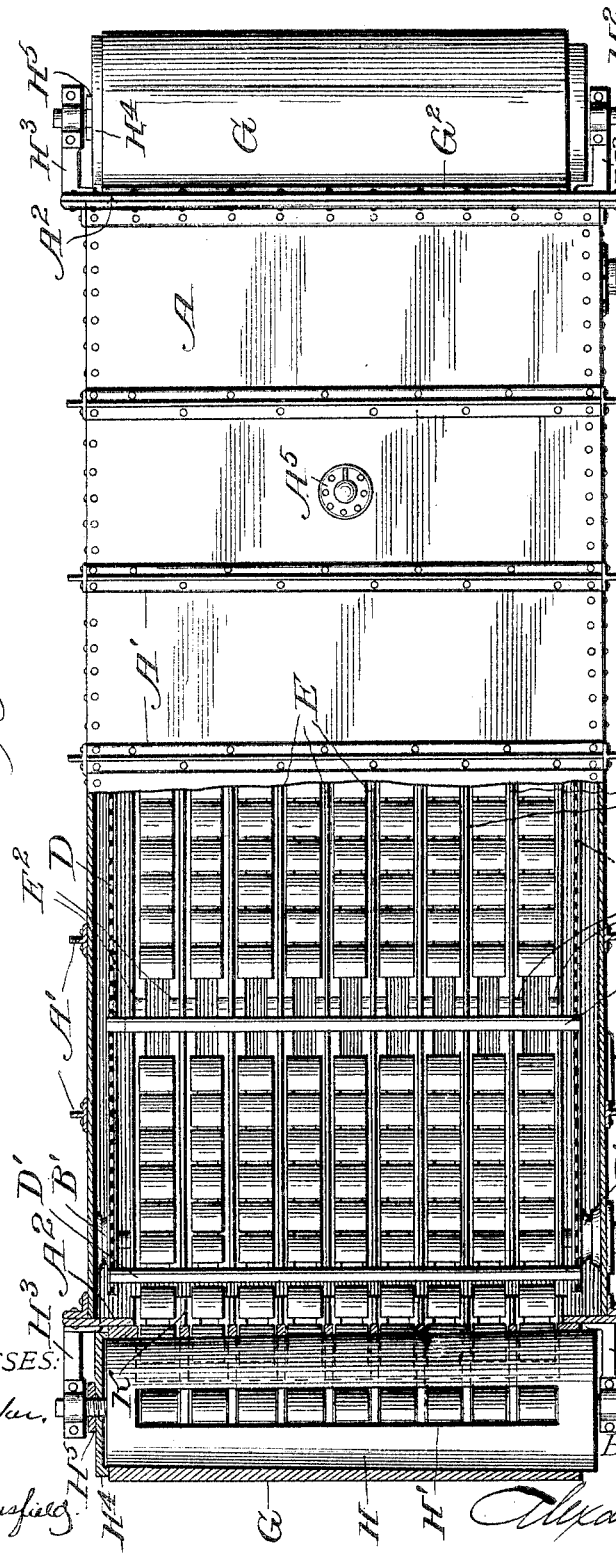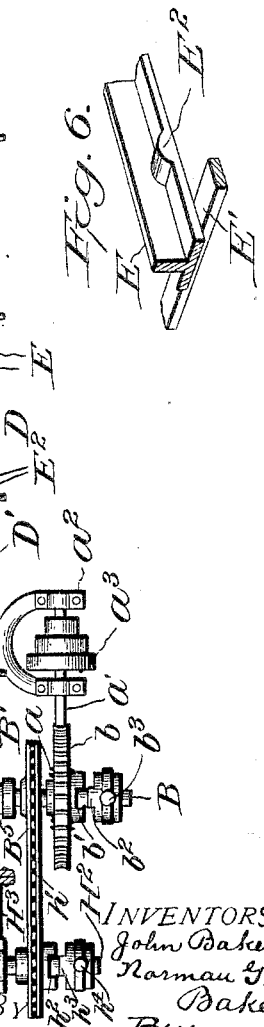

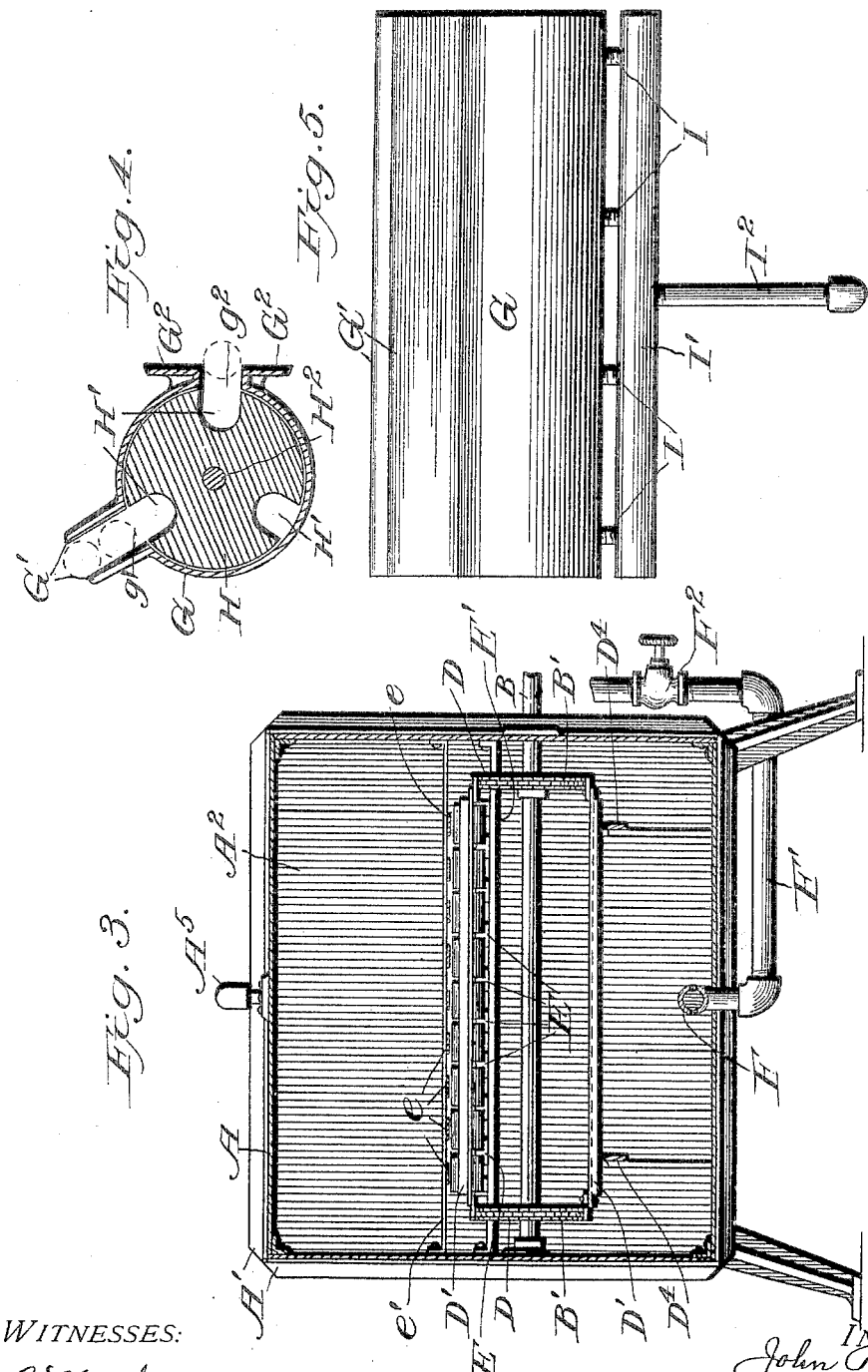

JOHN BAKER AND NORMAN G. BAKER, OF HOOPESTON, ILLINOIS.

CAN-COOKING APPARATUS.

No. 802,254.      Specification of Letters Patent.      Patented Oct. 17, 1905.

Application filed January 30, 1905. Serial No. 243,320.

*To all whom it may concern:*

Be it known that we, JOHN BAKER and NORMAN G. BAKER, of Hoopeston, Vermilion county, Illinois, have invented certain new and useful Improvements in Can-Cooking Apparatus; and we hereby declare that the following is a full, clear, and exact description thereof, reference being had to the accompanying drawings, which form part of this specification.

This invention is an improved apparatus for cooking and sterilizing vegetables, fruits, and other canned or bottled products, and is especially designed for use in the so-called "continuous-process" canning wherein green or uncooked canned goods are fed into the apparatus at one point and cooked cans are delivered therefrom at another, the cans being cooked by hot water or steam during their passage through the apparatus.

By "cans" herein we mean any kind of vessels containing perishable vegetables, fruits, meats, &c.

The object of the present invention is to produce a simple economical apparatus of large capacity wherein the cans are kept in continual motion and jarred at intervals, so that their contents are thoroughly agitated, insuring thorough and uniform cooking thereof, and wherein the introduction and emission of the cans will be attended with the least amount of waste of hot water or steam; and the invention consists in the novel construction of the complete apparatus and of parts and combination of parts therein, as hereinafter claimed, and more fully described with reference to the accompanying drawings, which illustrate the preferred form of the apparatus, but not to scale, the dimensions thereof being varied according to the desired capacity of the cooker.

In said drawings, Figure 1 is a side elevation, partly in section, of the complete apparatus, showing the gears $B^5 C^5$ and chains $h'$ in elevation, said gears and chain being outside of the tank A, as shown in Fig. 2. Fig. 2 is a plan view thereof, partly in section. Fig. 3 is a cross-section on line 3 3, Fig. 1. Fig. 4 is a detail sectional view of the casing G and its cylinder. Fig. 5 is a side view of the casing G, and Fig. 6 is a detail perspective view of the track-irons provided with projections for jarring the cans.

The apparatus comprises a tank A, which is preferably rectangular in cross-section and capable of withstanding considerable steam-pressure. It may be made of sheet-metal plates, riveted together and strengthened by external angle-irons $A'$ and closed at the ends by metal heads $A^2$. It should be provided with a thermometer $A^3$, pressure-gage $A^4$, and relief-valve $A^5$. It is also preferably provided with glass-covered sight-openings $A^6$ at each end, so that the contents of the tank can be seen. Within the tank, near the opposite ends thereof, are transverse shafts B C, the former being arranged above the level of the latter, and on these shafts are sprocket-wheels $B' C'$, over which run endless sprocket-chains D, which are connected at intervals by transverse bars $D'$, adapted to serve as can-pushers. Extending between the shafts B C and in a plane just below the upper run of the chains D is a canway formed by longitudinally-arranged track-irons E, supported upon transverse bars $E'$, fastened to the side walls of the tank. The canway inclines downwardly from shaft B to shaft C, so that cans placed thereon will tend to roll down by gravity; but positive movement of the cans is assured by the pusher-bars $D'$. The canways are provided at intervals with projections $E^2$, which may be formed of metal pieces attached to the irons E or in other convenient manner, as indicated in Figs. 2 and 6, the object of these projections being to jar the cans moving thereover so that the contents of the cans will be more thoroughly agitated than their sliding or rolling movements along the canway would effect. Arranged above and extending along the canway are retainer strips or bars $e$, supported by transverse bars $e'$ and adapted to keep the cans down on the tracks and prevent their riding over each other when pushed along the tracks. Below the lower run of the chains D supporting-bars $D^4$ may be placed to support the pusher-bars $D'$ on the lower run of the chains, and thus lessen the sag of the chain and the strain on the shafts B C.

The tank may be supplied with hot water or steam, or both, through a perforated pipe F, arranged longitudinally in the lower part thereof and connected with a supply-pipe $F'$, leading to a boiler or other supply and provided with a controlling-valve F². One end of each shaft B C projects outside the tank through a suitable stuffing-box. On the projecting end of shaft B is loosely mounted a worm-gear $b$, provided with a clutch-face $b'$, adapted to be engaged by a clutch-block $b^2$, slidably keyed to shaft B and operated by a shifting-lever $b^3$, by which means the gear can be locked to the shaft at will. Gear $b$ meshes with a worm $a$ on a shaft $a'$, journaled in a bracket $a^2$, attached to the casing and provided with a cone-pulley $a^3$, which can be belted to any suitable driver. (Not shown.) By this means the desired slow movement can be imparted to shaft B and to chains D, which transmit motion from shaft B to shaft C.

The cans are fed into the tank at the end adjacent shaft B and delivered therefrom at the other end by similar devices, which are constructed alike, and therefore the explanation of one will describe both. Each device comprises a cylindrical casing G, which may be open at both ends and is preferably slightly conical interiorly. This casing has an opening $g'$ at one side surrounded by radially-projecting flanges G', and it has another opening $g^2$ in its side about one hundred and twenty degrees removed from opening $g'$, at the sides of which are flanges G², by which the casing may be secured to the head of the tank, so that the opening $g^2$ coincides with a like slot or opening in the end of the tank to permit cans to pass from the casing into the tank, or vice versa. Fitted within the casing is a long cylinder H, preferably slightly tapered exteriorly and provided with a number of longitudinal recesses H', (three being shown,) adapted to successively register with openings $g'$ $g^2$ to receive and deliver cans. The cylinder has a shaft H², journaled in brackets H³, attached to the adjacent end of the tank, and the cylinder may be adjusted so as to fit closely in the casing by means of a spider or head H⁴, strung on shaft H² at the small end of the cylinder and bearing against the small end of the casing, and a nut H⁵, screwed on a threaded portion of the shaft and bearing against said spider. The cylinder is rotated when desired by means of a sprocket-gear loosely mounted on shaft H² and driven by chain $h'$ from a sprocket B⁵ or C⁵ on the projecting end of the adjacent shaft B or C. Sprocket $h$ has a clutch-face $h^2$, adapted to be engaged by a clutch-block $h^3$, splined on shaft H² and operated by a shifting-lever $h^4$, so that the cylinder can be rotated or stopped at the will of the operator without stopping the other parts of the apparatus. At the infeed end of the machine the casing G is arranged with opening $g'$ uppermost and at the outfeed end with the opening $g'$ lowermost. The tops of flanges G' at the infeed end will be above the normal water-level in the tank, while the opening $g'$ at the outfeed end is below the water-level.

To prevent waste of steam at the inlet and outlets of the tank, pipes I I may be tapped into the casing G at proper points between the openings $g'$ $g^2$, pipes I connecting with a header I', from which pipe I² conducts the waste water and steam into a receiver I³, from whence it can be pumped back into the tank or to the boiler, if desired. In this way loss of water and steam and annoying collection of steam in the cooking-room is prevented.

The space between the inlet-opening in the tank and the top of the canway is bridged by a chute K, and the space between the lower end of the canway and outlet-opening is bridged by a chute $k$, so that the cans will pass onto and from the canway properly.

Operation: The tank being filled with hot water or steam, or both, and shaft $a'$ driven from any suitable power, and a supply of uncooked cans being ready, the operator throws clutch $b^2$ into engagement with gear $b$, starting the can-pushers and shafts B C. Then the infeed-cylinder is started by throwing clutch-block $h^3$ into engagement with sprocket $h$, and the cans are fed into the grooves of the feed-cylinder through opening $g'$ by hand or machinery, and they should be fed fast enough to fill the grooves and supply a row across the canway each time a channel in the cylinder registers with the opening into the tank. When this occurs, the cans in the cylinder roll into the tank by gravity and pass onto the upper end of the canway. The apparatus should be so timed that during their passage from the inlet to the outlet along the canway the goods in the can will be properly cooked or sterilized. When the first cans near the outlet, the delivery-cylinder is put in operation, and the cans passing off the canway enter the channels of the delivery-cylinder and are passed out thereby. When properly operating, a row of cans is delivered for every row of cans fed in. When all the cans are fed in, the feed-cylinder is stopped; but the delivering continues until the tank is emptied. By making the infeed and delivery cylinder independently regulable, we avoid the waste which results when these have to be run empty. As the cans pass along the canway they are jarred by the obstructions or projections thereon, so that they are well shaken, which facilitates and insures thorough and equal cooking of their contents.

Having thus described our invention, what we claim as new, and desire to secure by Letters Patent, is—

1. In a can-cooking apparatus, the combination of a tank, a rotary infeed-cylinder at one end thereof, a rotary delivery-cylinder at the other end thereof; an inclined canway within the tank, intermediate the feed and delivery openings, endless chains within the tank, can-pushers on said chains, adapted to move the cans along said canway, and projections or can-jarring devices along the canway.

2. In a can-cooking apparatus, the combination of a closed tank having an inlet at one end and an outlet at the other, a rotatable feed-cylinder at the inlet of the tank, and a rotatable delivery-cylinder at its outlet; an inclined canway within the tank between the inlet and outlet, means for jarring the cans at intervals on said canway, endless chains, pushers, attached to said chains adapted to move cans along said canway, shafts and sprockets for driving said chains, and means whereby the adjacent cylinders are driven from said shafts.

3. In a can-cooking apparatus, the combination of a tank having an inlet at one end and an outlet at the other, a rotatable feed-cylinder at the inlet of the tank, and a rotatable delivery-cylinder at its outlet; a canway within the tank between the inlet and outlet, endless chains, pushers attached to the chains adapted to move cans along said canway, shafts and sprockets for driving said chains, and means whereby either or both of the cylinders can be thrown into or out of operation.

4. In combination a tank having an inlet and an outlet at opposite ends of the canway, a canway within the tank for conducting cans from the inlet to the outlet, shafts within the tank at each end of the canway, sprockets on said shafts, endless chains running over said sprockets, can-pushers carried by said chains, and means for driving said shafts; with a feed-cylinder at the inlet of the tank, a delivery-cylinder at the outlet thereof, and means for driving said cylinders respectively from the adjacent shaft in the tank.

5. In a can-cooking apparatus, the combination of a tank having an inlet at one end and an outlet at the other, an inclined canway within the tank for conducting cans from the inlet to the outlet, shafts within the tank at each end of the canway, sprockets on said shafts, endless chains running over said sprockets, can-pushers attached to said chains, and means for driving said shafts; with a feed-cylinder at the inlet of the tank, a delivery-cylinder at the outlet thereof, means for driving said cylinders respectively from the adjacent shaft in the tank, and clutch devices whereby either or both cylinders can be thrown in or out of operation at will.

6. For a cooking apparatus, a feed or delivery device comprising a casing provided with longitudinal inlet and outlet openings in its side; a cylinder in said casing having a plurality of longitudinal channels adapted to successively register with the inlet and outlet openings in the casing, means for rotating said cylinder, and a clutch for stopping or starting the cylinder without stopping the driving means.

7. In a can-cooking apparatus, the combination of a tank, a feed or delivery device connected therewith, comprising a casing having inlet and outlet openings, and a rotatable cylinder in said casing having longitudinal pockets or channels adapted to successively register with the openings in the casing; with means for exhausting the water or steam from such pockets between the openings in the casing.

8. In a can-cooking apparatus, the combination of a closed tank, means for introducing hot water or steam thereinto, an inlet at one end and an outlet at the other, an inclined canway composed of strap-iron leading from the inlet to the outlet; transverse shafts in the tank at opposite ends of the canway, sprockets on said shafts, chains running over said sprockets, can-pushers attached to said chains, can-retainers arranged along parallel with and above the canway, and pusher-supports arranged below the canway.

9. In a can-cooking apparatus, the combination of a closed tank, means for introducing hot water or steam thereinto, an inlet at one end and an outlet at the other, an inclined canway composed of strap-iron leading from the inlet to the outlet, projections on the canway to jar the cans, transverse shafts in the casing at opposite ends of the canway, sprockets on said shafts, chains running over said sprockets, can-pushers attached to said chains, can-retainers arranged along and above the canway, and pusher-supports arranged below the pathway.

10. In a can-cooking apparatus, the combination of a tank, having an inlet at one end and an outlet at the other, a canway within the tank leading from the inlet to the outlet, shafts at each end of the canway, sprockets on said shafts, endless chains passing around said sprockets, can-pushers carried by said chains, and means for driving said shafts; with a rotatable feed-cylinder at the inlet of the tank to feed cans thereinto; a similar cylinder at the outlet of the tank to deliver cans therefrom; and means for driving the said cylinders respectively from the adjacent shafts in the tank.

11. In a can-cooking apparatus, the combination of a tank, having an inlet at one end and an outlet at the other, a canway within the tank leading from the inlet to the outlet, and shafts at each end of the canway, sprockets on said shafts, endless chains passing around said sprockets, can-pushers carried by said chains, and means for driving said shafts; with a longitudinally-recessed rotatable cylinder at the inlet of the tank to feed cans thereinto; a similar cylinder at the outlet of the tank to deliver cans therefrom; means for driving the said cylinders respectively from the adjacent shafts in the tank and clutch devices whereby either or both cylinders may be thrown out of operation at will, and means for returning any water withdrawn by the cylinders back to the tank.

In testimony that we claim the foregoing as our own we affix our signatures in presence of two witnesses.

JOHN BAKER.
NORMAN G. BAKER.

In presence of—
D. E. WRIGHT,
N. V. AXTELL.